United States Patent
Ebenezer et al.

(10) Patent No.: US 11,822,519 B2
(45) Date of Patent: Nov. 21, 2023

(54) MULTI-DIMENSIONAL DATABASE PLATFORM INCLUDING AN APACHE KAFKA FRAMEWORK AND AN AUXILIARY DATABASE FOR EVENT DATA PROCESSING AND PROVISIONING

(71) Applicant: Bank of America Corporation, Charlotte, NC (US)

(72) Inventors: Daniel Ebenezer, Simi Valley, CA (US); Dilip Raja, Simi Valley, CA (US); Aravindkumaar Baskaran, Tamil Nadu (IN); Muthupandian Kulenthaivelu, Cary, NC (US); Ramdas Narayanan, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/537,784

(22) Filed: Nov. 30, 2021

(65) Prior Publication Data
US 2023/0169043 A1    Jun. 1, 2023

(51) Int. Cl.
*G06F 7/00* (2006.01)
*G06F 16/18* (2019.01)

(52) U.S. Cl.
CPC ..................................... *G06F 16/18* (2019.01)

(58) Field of Classification Search
CPC ...... G06F 16/18; G06F 16/748; G06F 16/958; G06F 16/86
See application file for complete search history.

(56) References Cited

U.S. PATENT DOCUMENTS

| | | | | |
|---|---|---|---|---|
| 10,789,553 B1* | 9/2020 | Bhatwadekar | ...... | G06F 16/9535 |
| 11,514,047 B2* | 11/2022 | Adams | .............. | G06F 16/24537 |
| 2016/0085399 A1* | 3/2016 | Jain | ........................... | G06F 8/34 |
| | | | | 715/738 |
| 2016/0321308 A1* | 11/2016 | Brinnand | .............. | G06F 16/215 |
| 2017/0310628 A1* | 10/2017 | Norwood | ................ | H04L 51/23 |
| 2018/0341989 A1* | 11/2018 | Reim | ................. | G06Q 30/0273 |
| 2019/0034980 A1* | 1/2019 | Allen | ................. | G06Q 30/0267 |

(Continued)

*Primary Examiner* — Mohammed R Uddin
(74) *Attorney, Agent, or Firm* — Weiss & Arons LLP

(57) ABSTRACT

Systems and methods for event data processing and provisioning using a multi-dimensional database platform including an Apache Kafka framework and an auxiliary database are provided. Methods may include receiving an event profile from a data producer module, tagging the event profile with a timestamp, a unique event identification code, an event type descriptor, a data producer identifier, and a workflow identifier. The method may also include logging, in the Apache Kafka framework, the timestamp and the event identification code, as part of a sequential stream of events; and storing, in the auxiliary database, the event identification code, the event type descriptor, the data producer identifier, and the workflow identifier. The method may include receiving a request from a data consumer module for a customized workflow diagnostic and generating the customized workflow diagnostic based on the specification and on data from the Apache Kafka framework and the auxiliary database as linked via the event identification code. The method may also include transmitting the customized workflow diagnostic to the data consumer module.

19 Claims, 8 Drawing Sheets

(56) References Cited

U.S. PATENT DOCUMENTS

| | | | |
|---|---|---|---|
| 2019/0362370 A1* | 11/2019 | Philips | H04W 4/029 |
| 2019/0384835 A1* | 12/2019 | Luo | G06F 16/1865 |
| 2020/0125572 A1* | 4/2020 | Hanckel | G06F 16/248 |
| 2020/0320550 A1* | 10/2020 | Reichert | H04W 4/33 |
| 2020/0326991 A1* | 10/2020 | Carroll | G06Q 10/0631 |
| 2020/0394709 A1* | 12/2020 | Cella | G06Q 40/08 |
| 2021/0094594 A1* | 4/2021 | Valentino | B61L 15/0018 |
| 2021/0097343 A1* | 4/2021 | Goodsitt | G06K 9/6257 |
| 2021/0271532 A1* | 9/2021 | Nitsopoulos | G06Q 40/02 |
| 2021/0357378 A1* | 11/2021 | Urdiales | G06F 16/2237 |
| 2022/0114163 A1* | 4/2022 | Seetharaman | G06F 16/2379 |
| 2022/0309053 A1* | 9/2022 | Wang | G06F 16/2365 |
| 2022/0383417 A1* | 12/2022 | Cummings | H04L 9/32 |

\* cited by examiner

PPP STATUS

MULTI-DIMENSIONAL DATABASE PLATFORM INCLUDING AN APACHE KAFKA FRAMEWORK AND AN AUXILIARY DATABASE FOR EVENT DATA PROCESSING AND PROVISIONING

FIELD OF TECHNOLOGY

Aspects of the disclosure relate to digital systems. Specifically, aspects of the disclosure relate to database platforms.

BACKGROUND OF THE DISCLOSURE

Apache Kafka is a popular event streaming platform that provides a high-throughput, low-latency platform for handling real-time data feeds. The Kafka platform captures events from one or more processes called "producers." The Kafka platform logs the events in a cluster of one or more servers, which may be partitioned, or segmented, into one or more "Kafka topics." One or more processes called "consumers" can receive data from the topics.

While useful for storing event-based data feeds, the Kafka platform has deficiencies in an environment with multiple workflows, especially when the workflows are dynamic. Moreover, different consumers of the data may desire different ways of processing and consuming the data.

It would be desirable, therefore, to provide a multi-dimensional database platform built on top of the Apache Kafka framework for event data processing and provisioning. It would be further desirable for the multi-dimensional database platform to be dynamic and configurable. It would be still further desirable for the multi-dimensional database platform to track disparate workflows and generate customizable workflow diagnostics regarding same.

SUMMARY OF THE DISCLOSURE

Aspects of the disclosure relate to a multi-dimensional database system for event data processing and provisioning. The system may include an Apache Kafka framework, an auxiliary database, a processor. The system may also include computer code stored in non-transitory memory that, when run on a processor, may be configured to execute some or all method steps and/or system functions.

The system may be configured to receive an event profile from one of a plurality of data producer modules. The system may be configured to tag the event profile with: a timestamp, a unique event identification code, an event type descriptor, a data producer identifier, and/or a workflow identifier.

The system may be configured to log, in the Apache Kafka framework, the timestamp and the event identification code, as part of a sequential stream of events.

The system may be configured to store, in the auxiliary database, the event identification code, the event type descriptor, the data producer identifier, and the workflow identifier. The system may be configured to link the information stored in the auxiliary database to the information logged in the Apache Kafka framework via the event identification code.

The system may be configured to receive a request from one of a plurality of data consumer modules for a customized workflow diagnostic. The request may include a specification for the customized workflow diagnostic.

The system may be configured to generate the customized workflow diagnostic based on the specification and on data from the Apache Kafka framework and the auxiliary database as linked via the event identification code. The system may be configured to transmit the customized workflow diagnostic to the data consumer module.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
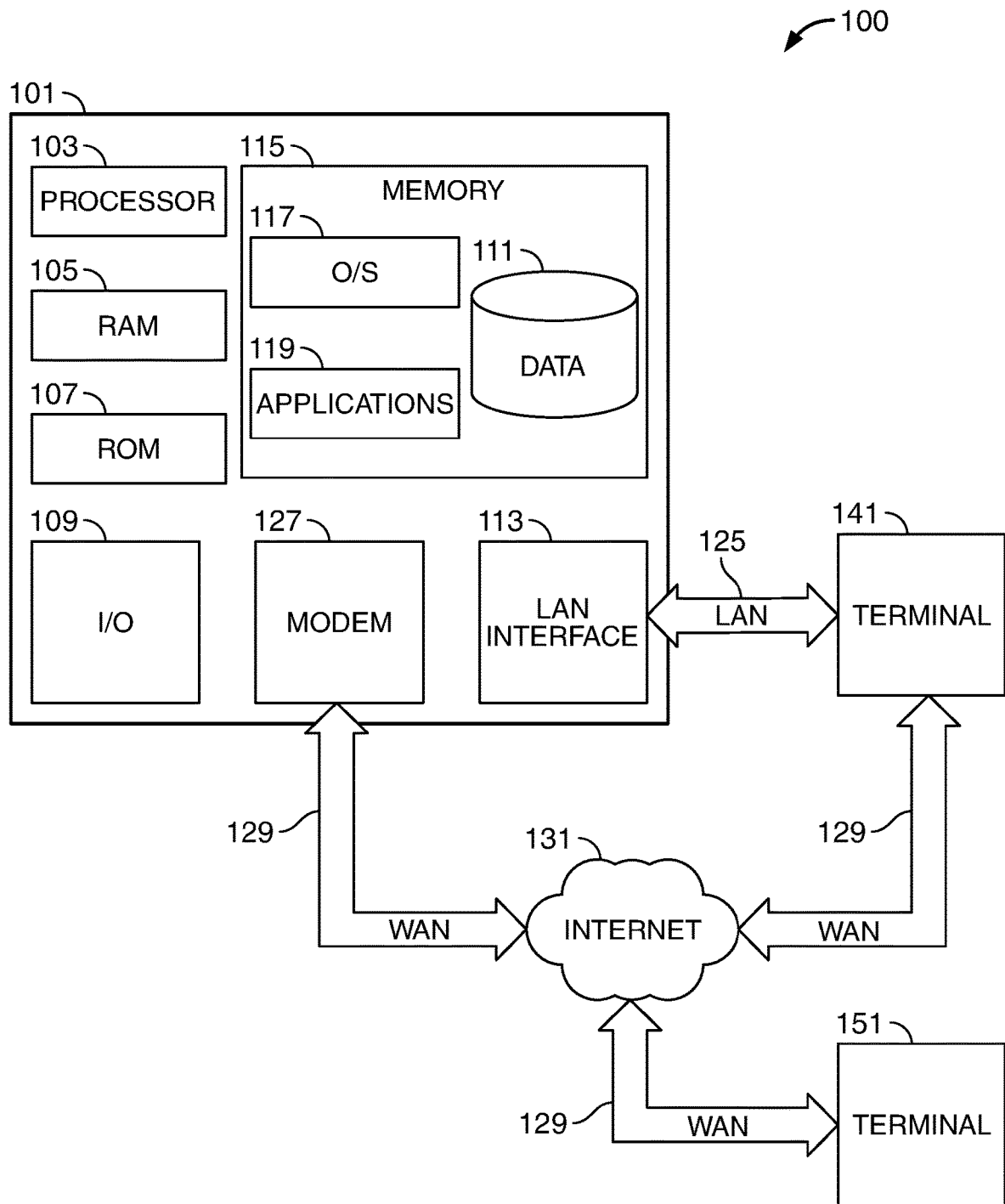
FIG. 1 shows an illustrative system in accordance with principles of the disclosure.

Aspects of the disclosure relate to a multi-dimensional database system for event data processing and provisioning. The system may include an Apache Kafka framework, an auxiliary database, and a processor. The Apache Kafka framework may be an event-based, sequential, data storage platform. The auxiliary database may be any database suitable for storing information. The information stored in the auxiliary database may relate to the information stored in the Kafka database.

The system may also include computer code stored in non-transitory memory that, when run on a processor, may be configured to execute some or all method steps and/or system functions. Features described herein with respect to systems may also pertain to related methods.

The system may be configured to receive an event profile from one of a plurality of data producer modules. An event profile may include information relating to an event. An event may be an occurrence that is relevant to the system. For example, in a system tailored to a financial institution, relevant events may include payments, account opening, closing, or modification, defaults, customer requests, or any other suitable event that may be relevant to the system. The system may receive a plurality of event profiles. The system may receive the event profiles in real-time. Real-time receipt of the event profile may include detection of the event when it happens and immediately processing the event in the manner disclosed herein. Processing the event may include the tagging, logging, and storing features as described herein.

A data producer module may include a software- and/or hardware-based system that produces event profiles. The data producers may, in certain embodiments, detect, receive, or generate the event profiles. Each data producer may, in some embodiments, be associated with a particular category of data. For example, one data producer may be associated with a mortgage group, another may be associated with loans, yet another with payment instruments, still others with accounts, etc.

The system may be configured to tag the event profile with a timestamp, a unique event identification code, an event type descriptor, a data producer identifier, and/or a workflow identifier.

The timestamp may include a date, hour, minute, second, millisecond, and/or any other suitable temporal information that may describe when the event occurred.

The unique event identification code may be an alphanumeric code (i.e., a sequence of letters, numbers, or both) that is generated uniquely for and assigned to each individual event profile.

The event type descriptor may describe a type, or category, of the event represented by the event profile. The event type descriptor may include a name. The event type descriptor may include a short description. The event type descriptor may, for example, be one of a list of predetermined event type descriptors. In some embodiments, the event type descriptor may include an alphanumeric code that may be mapped to an event type.

The data producer identifier may identify the data producer from which the event profile was received. The data producer identifier may, for example, include a name or code that references a group or category associated with the data producer module.

The workflow identifier may identify a workflow with which the event profile may be associated. For example, if the event profile represents a loan modification request, the event profile may be associated with a workflow that includes a loan modification request. The workflow may also include other events that may precede or follow the event represented by the event profile.

The system may be configured to log, in the Apache Kafka framework, the timestamp and the event identification code, as part of a sequential stream of events. The logging may be performed in real-time (i.e., immediately after receipt of the event profile, which may be immediately after the event occurred). Other embodiments may employ any other suitable sequential event-based data storage framework.

The system may be configured to store, in the auxiliary database, the event identification code, the event type descriptor, the data producer identifier, and/or the workflow identifier. The storing may be performed in real-time (i.e., immediately after receipt of the event profile, which may be immediately after the event occurred). The system may be configured to link the information stored in the auxiliary database to the information logged in the Apache Kafka framework via the event identification code.

The system may be configured to receive a request from one of a plurality of data consumer modules for a customized workflow diagnostic. A data consumer module may include a software- and/or hardware-based system that utilizes the events represented by the event profiles. The data consumer module may, for example, be associated with a data analytics group. The workflow diagnostic may include a report or other suitable representation of data. The request may include a specification for the customized workflow diagnostic.

The system may be configured to generate the customized workflow diagnostic based on the specification and on data from the Apache Kafka framework and the auxiliary database as linked via the event identification code. For example, the specification of the customized workflow diagnostic may request a report based on a certain group of events with certain characteristics. The system may relate the events stored in the Kafka event-based framework to the characteristics stored in the auxiliary database via the event identification code, and thereby be able to generate the requested report. In some embodiments, the specification may further specify a format for the workflow diagnostic. The format may, be example, be an Excel spreadsheet, a bar graph, a pie chart, or any other suitable format for the workflow diagnostic.

The system may be configured to transmit the customized workflow diagnostic to the data consumer module. The workflow diagnostic may, in certain embodiments, be accessible via a display of a computing device. Accessibility may, for example, be achieved via logging in to a portal or account.

In certain embodiments, when logging the timestamp and the event identification code in the Apache Kafka framework, the system may be further configured to create a primary entry and a secondary entry in the Kafka framework. The primary entry may include the event identification code, the timestamp, and a log identification code. The log identification code may be an alphanumeric code that identifies the log position or location of the event profile in the Kafka framework. The secondary entry may include the log identification code and log attribute information. The log identification code may thereby link the primary and secondary entries.

In some embodiments, when storing the event identification code, the event type descriptor, the data producer identifier, and the workflow identifier in the auxiliary database, the system may be further configured to create a database entry comprising the event identification code, the event type descriptor, the data producer identifier, and the workflow identifier. The data producer identifier may be one of a plurality of data producer identifiers. Each of the plurality of data producer identifiers may be associated with data producer information. The workflow identifier may be one of a plurality of workflow identifiers. Each of the plurality of workflow identifiers may be associated with workflow information.

In certain embodiments, the data producer information may include a data producer name. The workflow information may include a workflow name, a parent workflow identifier (the parent workflow identifier may be a workflow identifier, or an event descriptor, that is associated with an event preceding the instant workflow identifier in a workflow sequence), and/or one of the plurality of data producer identifiers that is associated with the workflow.

The plurality of data producer identifiers and the plurality of workflow identifiers may, in certain embodiments, be stored in one or more lists of identifiers. The one or more lists of identifiers may, in certain embodiments, be stored in the auxiliary database and/or in one or more other databases.

In some embodiments, the system may be further configured to generate the customized workflow diagnostic based also on a set of rules. The set of rules may govern workflows associated with the event profile. The set of rules may, for example, include a time limit for responding to the event profile (e.g., if the event profile represents a loan modification request, the set of rules may include a time frame for responding to the request). In another example, the set of rules may include a definition of how to present information in the customized workflow diagnostic.

In some embodiments, the set of rules may be defined separately for each data consumer module. The definition for a particular data consumer module may be pre-defined. In some embodiments, the definition for a particular data consumer module may be defined in flight, at runtime (e.g., along with or part of the request).

In certain embodiments, the event profile may be one of a plurality of event profiles. The system may be further configured to perform the tag, log, store, and/or link for each of the plurality of event profiles. Moreover, the customized workflow diagnostic may be based on the plurality of event profiles. For example, the workflow diagnostic may include a report representing aggregate values or trends across the plurality of event profiles.

In some embodiments, the Apache Kafka framework may include a plurality of segmented topics for logging event profiles separately. The system may be further configured to segment the plurality of event profiles into predetermined categories and log the plurality of event profiles in the plurality of segmented topics based on the predetermined categories.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to event data streams. The input/output module may also include one or more speakers for providing audio output and a video display device for providing textual, audio, audiovisual, and/or graphical output. The input and output may be related to computer application functionality. The input and output may be related to event data streams.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to event data streams, and processing and/or provisioning the data streams.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
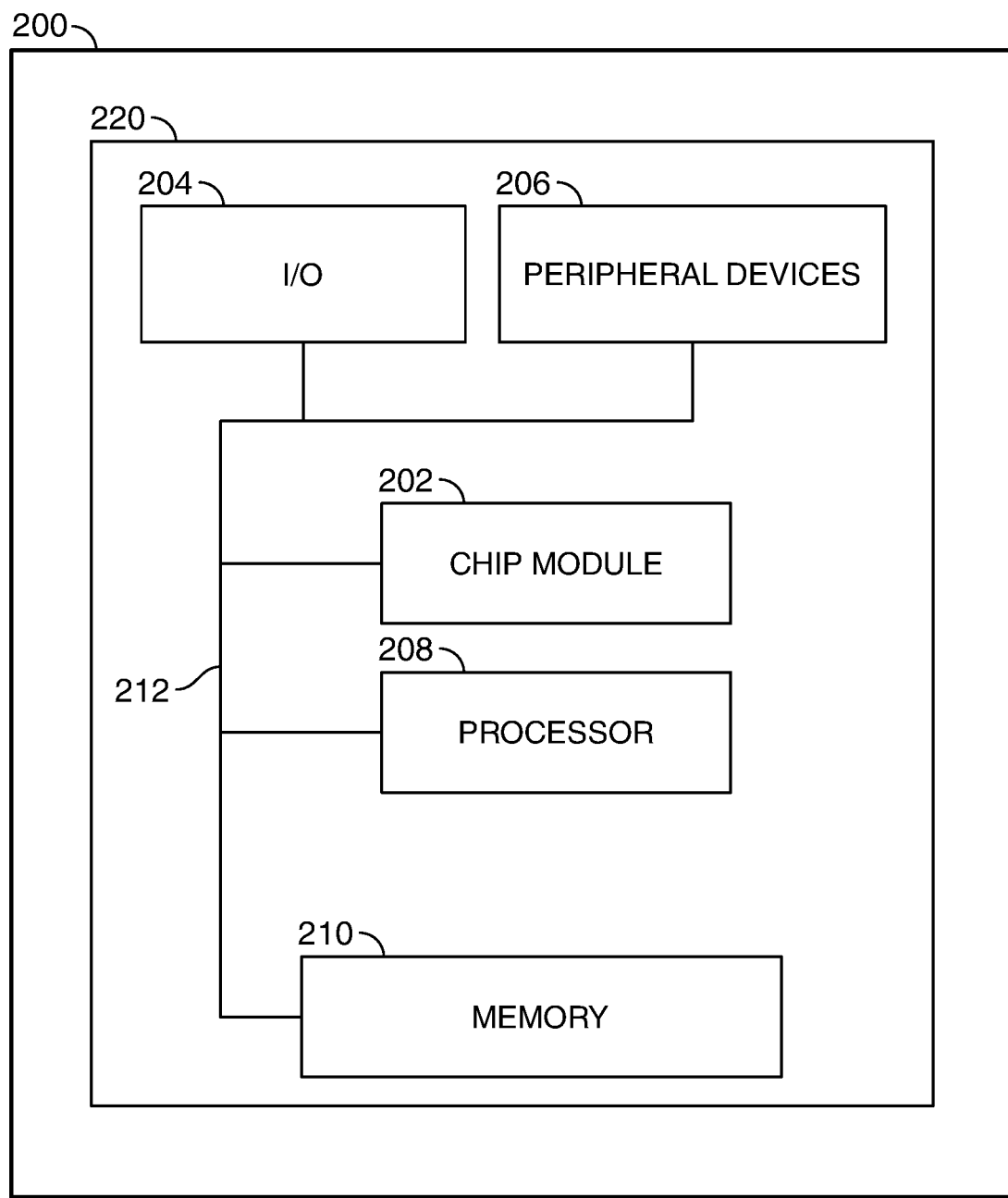
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
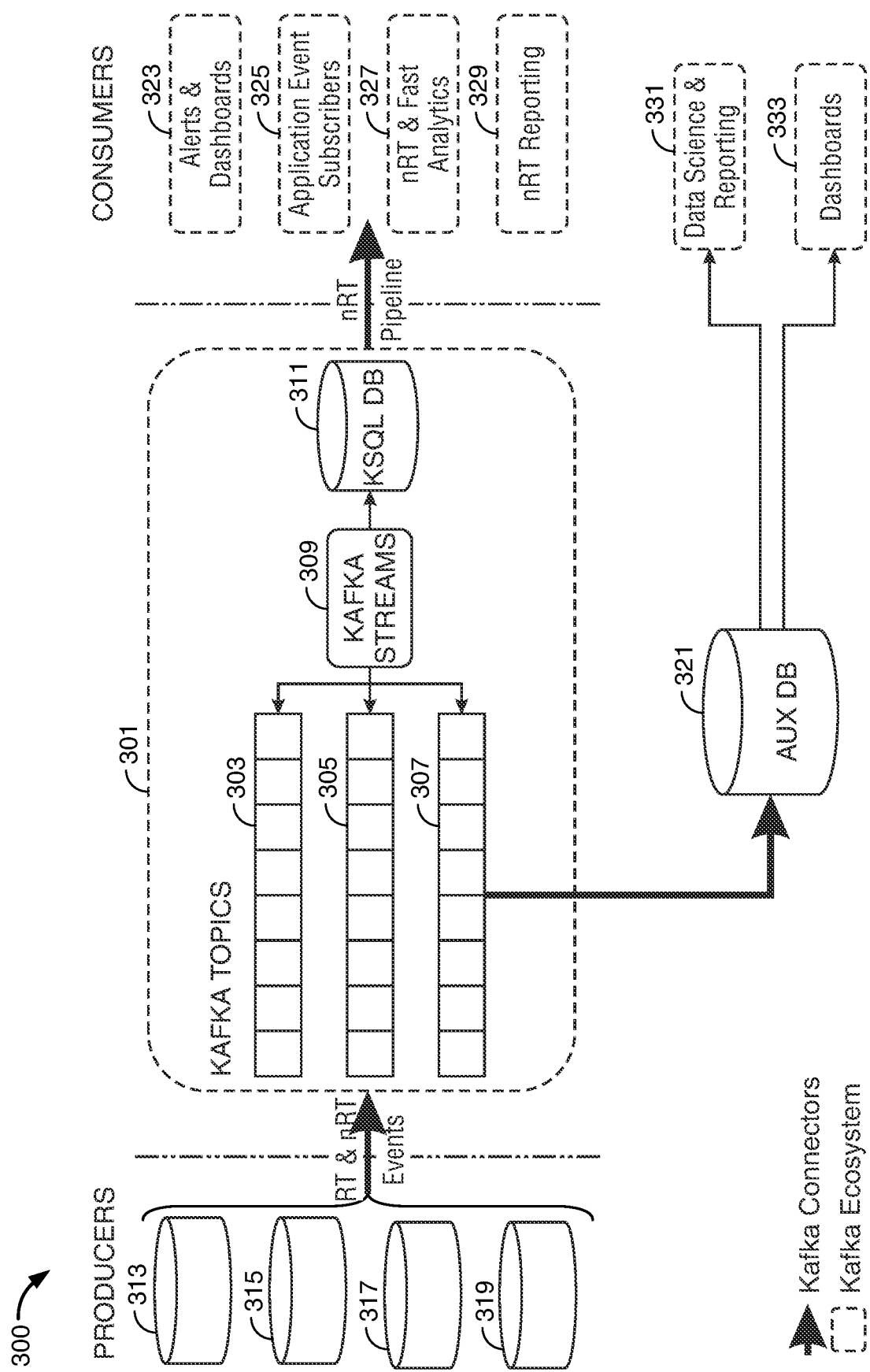
FIG. 3 shows an illustrative system architecture in accordance with principles of the disclosure.

FIG. 3 shows illustrative system architecture 300 in accordance with principles of the disclosure. Architecture 300 may include Kafka framework 301 and auxiliary database 321. Kafka framework 301 may include Kafka topics 303-307. Kafka framework 301 may include Kafka streams 309, which may include the sequential event streams stored in the framework. SQL database 311 may store some or all of the data in Kafka framework 301.

Data producer modules 313-319 may include one or more systems that feed event profiles into Kafka framework 301. Data producer modules 313-319 may include systems associated with data producers such as home loans retention systems, home loan mortgage servicing workflow, customer service, mortgage data exchange, and other suitable systems that may receive, detect, generate, or otherwise obtain event information that may be fed into Kafka framework 301 and/or auxiliary database 321. Event information may, in certain embodiments, be fed in real-time or near real-time into Kafka framework 301 and/or auxiliary database 321.

Architecture 300 may also include data consumer modules 323-333. Data consumer modules 323-333 may transmit requests for customized workflow diagnostics, which may be generated using the information stored in Kafka framework 301 and/or auxiliary database 321. The customized workflow diagnostics may include various reports, alerts, analytics, and/or dashboards. Dashboards may, for example, include dashboards from Tableau Software. Tableau dashboards may include interactive data visualization software that may include business intelligence features.

Figure 4:
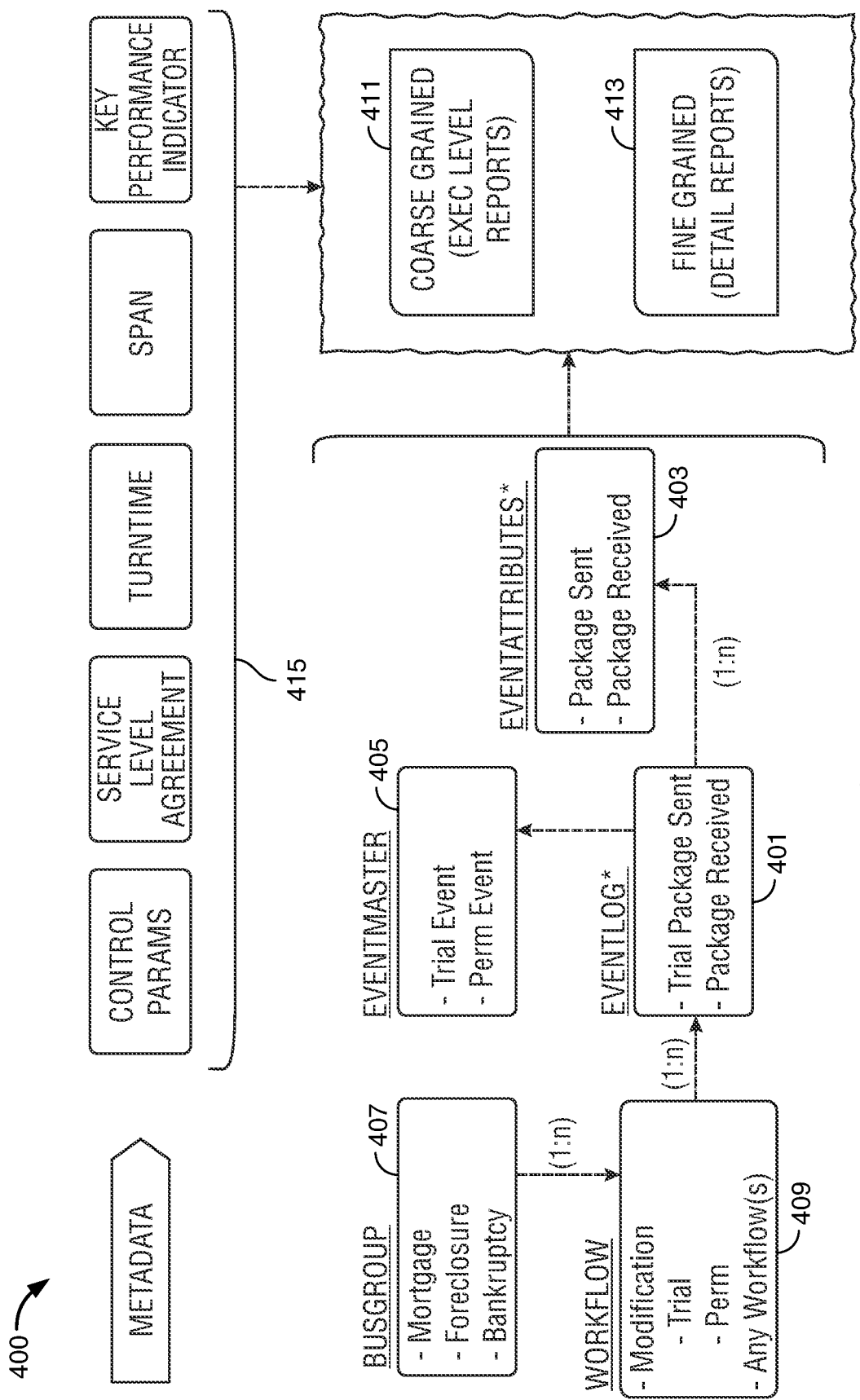
FIG. 4 shows another illustrative system architecture in accordance with principles of the disclosure.

FIG. 4 shows illustrative system architecture 400 in accordance with principles of the disclosure. Architecture 400 may include event log 401, which may include an event profile logged in a sequential event-based framework such as Kafka. Event attributes 403 may include attributes that are connected to the event profile logged at 401. Event attributes 403 may also be stored in Kafka. Event master 405 may include an entry that may include information providing context for the event stored at 401. Business group 407 may include information relating to a source group for the event of 401. Workflow 409 may include information relating to a workflow for the event of 401. Workflow 409 may include one or more ARTS workflows. Items 405-409 may be stored in an auxiliary database.

In an example, an event may include a request to modify a mortgage. The modification may, for example, include extending the period of the mortgage from 30 to 40 years and thereby reduce the monthly payment. This event may be a first event in a workflow that includes, as a subsequent event, initiation of a temporary trial period with the reduced payment. After a predetermined amount of time, if the trial period is successful, a subsequent event in the workflow may include executing the modification and permanently changing the loan from a 30-year loan at the higher rate to a 40-year loan at the lower rate. Each of these events may be fed into and logged in the Kafka framework in real-time. Each may also be stored in the auxiliary database with information providing context to the events such as a workflow and business group with which the event is associated.

The system may generate workflow diagnostics. The workflow diagnostics may, for example, include various reports. Reports may, for example, include coarse grained (i.e., more general/high-level) reports 411. The reports may also include fine grained (i.e., more detailed) reports 413. The workflow diagnostic generated may be a customizable by the data consumer module that transmitted the request for the diagnostic.

The system may also include set of rules 415. Rules 415 may include metadata, parameters, and rules that dictate how various workflows are performed. Rule 415 may also include specifications for how the data should be presented in the diagnostic.

Figure 5:
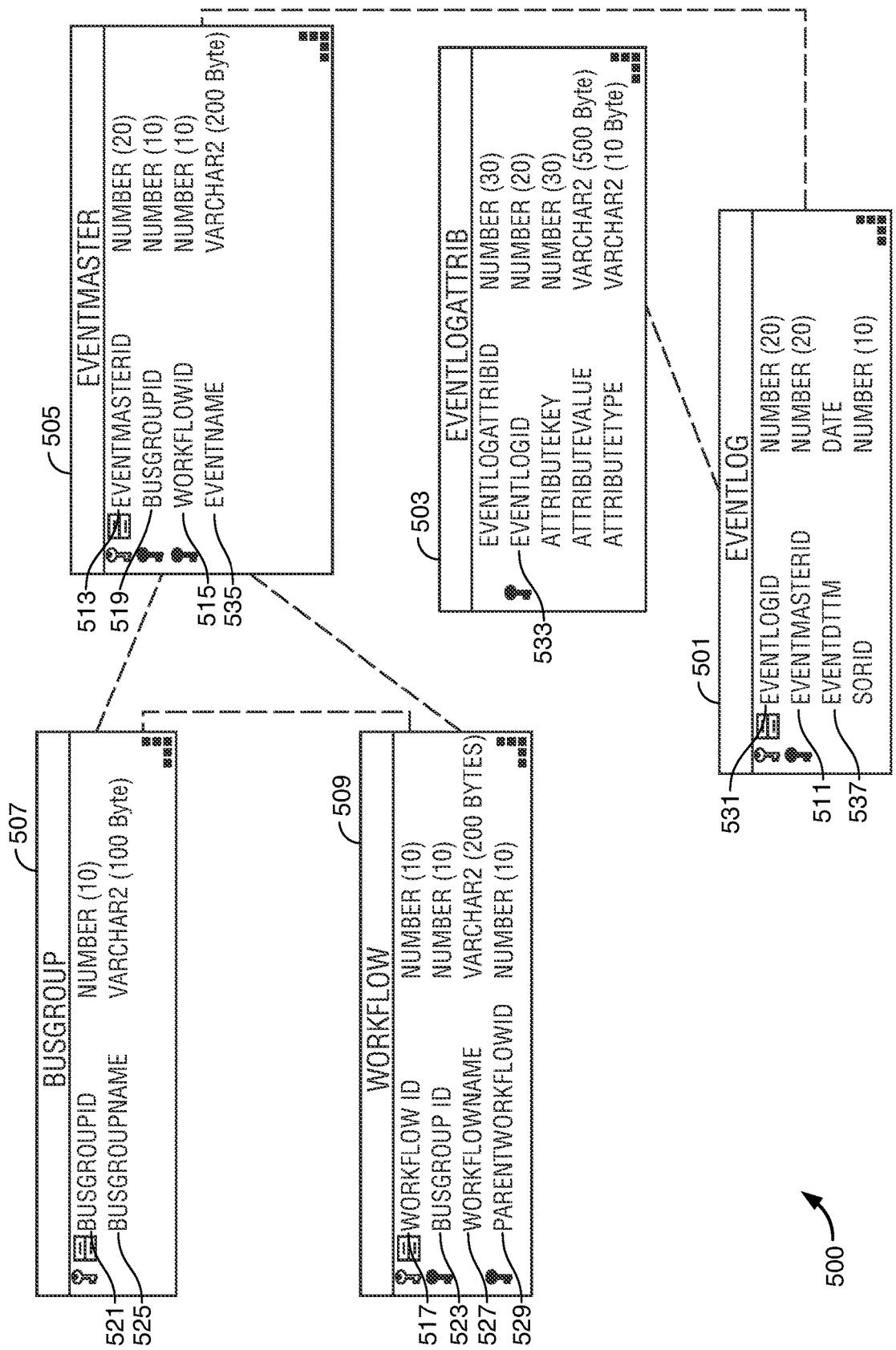
FIG. 5 shows yet another illustrative system architecture in accordance with principles of the disclosure.

FIG. 5 shows illustrative system architecture 500 in accordance with principles of the disclosure. Architecture 500 may show relationships between entities of an illustrative embodiment of the disclosed system. Items 501-509 of architecture 500 may be examples of data entries that correspond to items 401-409 of architecture 400.

For example, item 501 may show a data entry that may be a log of an event profile in a sequential database such as Kafka. Item 501 may include timestamp 537. Item 501 may include unique event identification code 511. Unique event identification code 511 may match unique event identification code 513 included in item 505, thereby linking items 501 and 505. Item 505 may be an entry in an auxiliary database corresponding to the event profile logged in Kafka as item 501. Item 505 may include information relating to the event profile, such as, for example, data producer identifier 519 (which may include an identifier of a business group that was the source of the event profile), workflow identifier 515, and event name 535.

Data producer identifier 519 may match data producer identifier 521 of item 507, thereby linking items 505 and 507. Item 507 may be a data entry corresponding to the data producer and may include other data producer information such as data producer name 525.

Workflow identifier 515 may match workflow identifier 517 of item 509, thereby linking items 505 and 509. Item 509 may be a data entry corresponding to the workflow and may include other workflow information such as workflow name 527 and parent workflow identifier 529. Workflow information may also include data producer identifier 523, which may be a data producer that is associated with this particular workflow. Data producer identifier 523 may, for example, match data producer identifiers 519 and 521.

The event data log entry of item 501 may be linked to another log entry such as item 503. Item 503 may also be logged in the sequential database. Item 503 may include various attributes relating to the event profile. Item 503 may be linked to item 501 via event log identifiers 531 and 533, which may match.

Figure 6:
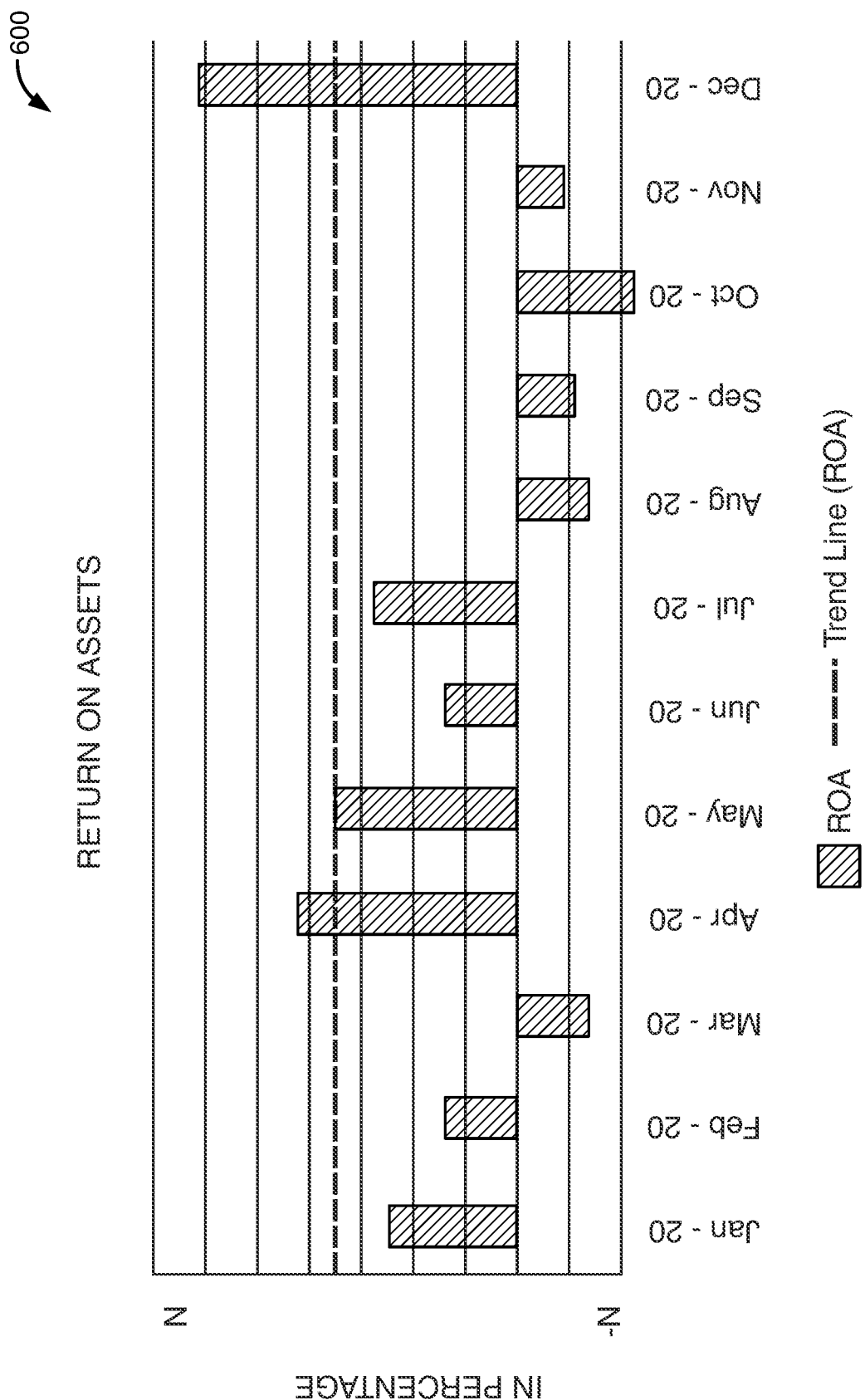
FIG. 6 shows an illustrative diagram in accordance with principles of the disclosure.
Figure 7:
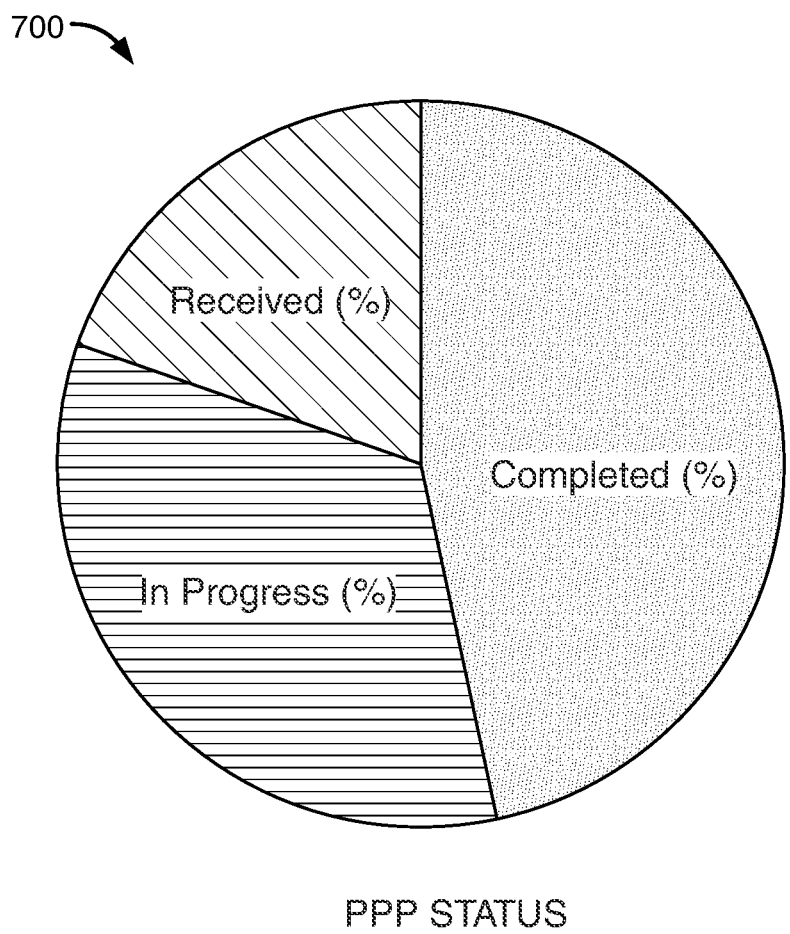
FIG. 7 shows another illustrative diagram in accordance with principles of the disclosure.
Figure 8:
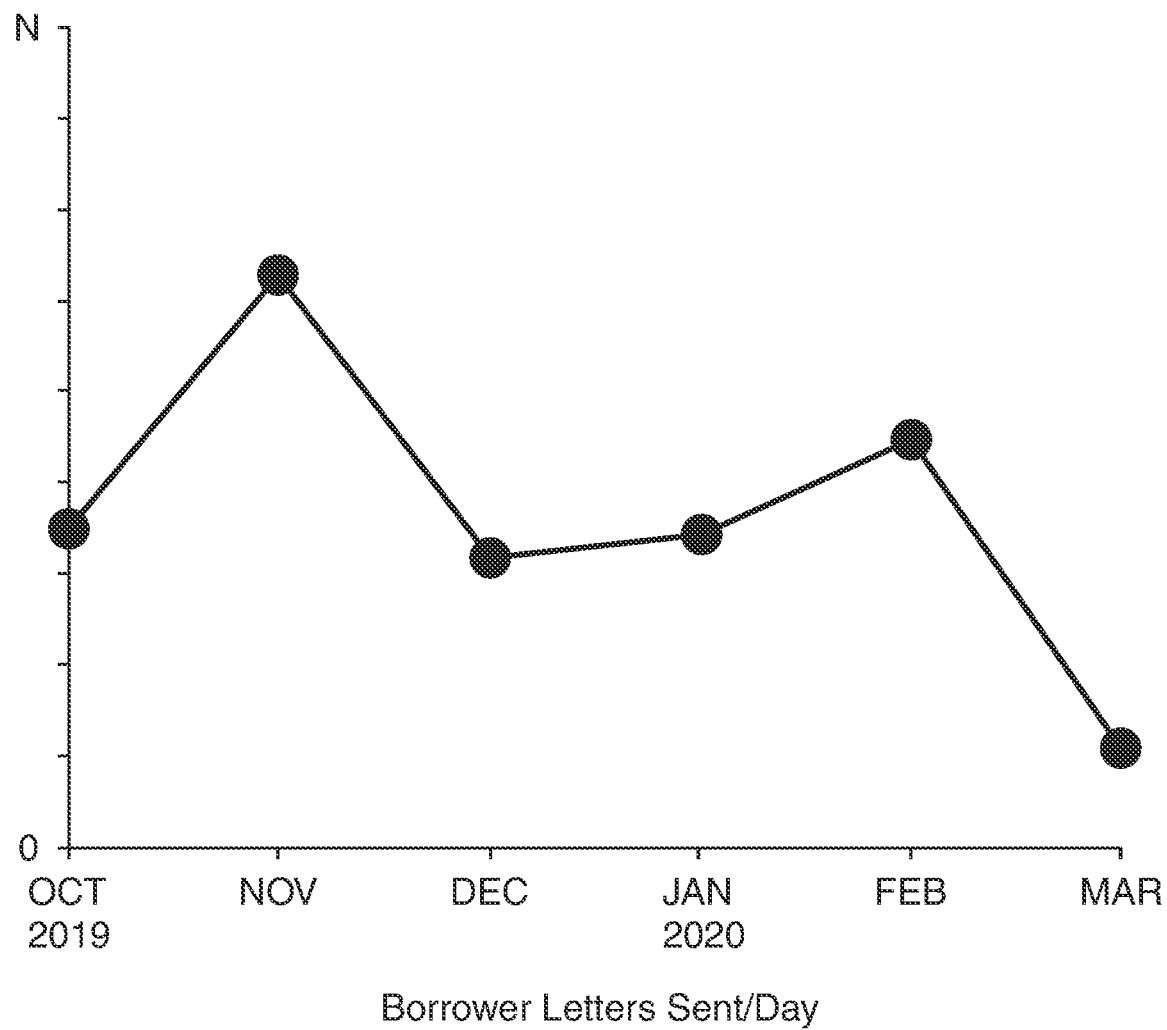
FIG. 8 shows yet another illustrative diagram in accordance with principles of the disclosure.

FIGS. 6-8 show illustrative diagrams 600, 700, and 800 in accordance with principles of the disclosure. The diagrams shown in FIGS. 6-8 may include various workflow diagnostics that may be generated and transmitted by the disclosed system. Diagram 600 may include a bar graph. The bar graph may, for example, show monthly return on asset values graphed over a specified time period. Diagram 700 may include a pie chart. The pie chart may, for example, show a breakdown of status of certain loans (e.g., Paycheck Protection Program loans). The pie chart may, for example, show a percentage of loans received, in progress, and completed. Diagram 800 may show a line graph. The line graph may represent certain values as they fluctuate over time. For example, the graph may show the number of borrower letters sent per day (e.g., as measured by number of letters or by aggregate dollar amount) as that value fluctuates over a time period.

Diagrams 600, 700, and 800 may be examples of high-level reports generated by the disclosed system. The system may also be configured to generate low level, or fine-grained, reports. Examples of fine-grained reports may include: How many loans are waiting in a loan management system for the borrower letters to be sent? Which Workflow/Sub-Workflow needs more resources to be added? What is the average time for loan modification? What is the response time when a borrower applies for PPP? Moreover, a data consumer module may be able to generate its own customized request specification that is tailored to the needs of that data consumer module.

Thus, systems and methods are provided for dynamic, configurable, and low latency event data processing and provisioning. The systems and methods may include a multi-dimensional database platform. The multi-dimensional database platform may, for example synthesize certain features of a sequential event-based framework (such as an Apache Kafka framework) and an auxiliary database. The Kafka framework may, for example, perform real-time event capture and logging. The Kafka logs may, in certain scenarios, lack certain contextual information. The auxiliary database may be configured to provide the missing contextual information. The information may be linked to the events in Kafka in such a way as to allow the system to synthesize the real-time event log with the contextual information to generate customizable diagnostics, dashboards, reports, or any other suitable data product.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a multi-dimensional database platform including an Apache Kafka framework and an auxiliary database for event data processing and provisioning are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for event data processing and provisioning using a multi-dimensional database platform including an Apache Kafka framework and an auxiliary database, said method executed by computer code stored in non-transitory memory and run on a processor, said method comprising:
  receiving an event profile from one of a plurality of data producer modules, wherein said event profile represents a customer request;
  tagging the event profile with:
    a timestamp;
    a unique event identification code;
    an event type descriptor;
    a data producer identifier wherein the data producer identifier identifies a data producer from which the event profile was received; and
    a workflow identifier;
  logging, in the Apache Kafka framework, the timestamp and the event identification code, as part of a sequential stream of events, said logging comprising:
    creating a primary entry comprising the event identification code, the timestamp, and a log identification code; and creating a secondary entry comprising the log identification code and log attribute information;
storing, in the auxiliary database, the event identification code, the event type descriptor, the data producer identifier, and the workflow identifier;
linking the information stored in the auxiliary database to the information logged in the Apache Kafka framework via the event identification code;
receiving a request from one of a plurality of data consumer modules for a customized workflow diagnostic, said request comprising a specification for the customized workflow diagnostic;
generating the customized workflow diagnostic based on the specification and on data from the Apache Kafka framework and the auxiliary database as linked via the event identification code; and
transmitting the customized workflow diagnostic to the data consumer module wherein a set of rules governing workflow associated with the event profile is defined for the data consumer module.

2. The method of claim 1 wherein:
the storing in the auxiliary database comprises creating a database entry comprising the event identification code, the event type descriptor, the data producer identifier, and the workflow identifier, wherein:
the data producer identifier is one of a plurality of data producer identifiers, and each of the plurality of data producer identifiers is associated with data producer information; and
the workflow identifier is one of a plurality of workflow identifiers, and each of the plurality of workflow identifiers is associated with workflow information.

3. The method of claim 2 wherein:
the data producer information comprises a data producer name; and
the workflow information comprises:
a workflow name;
a parent workflow identifier, said parent workflow identifier being a one of the plurality of workflow identifiers that precedes the instant workflow identifier in a workflow sequence; and
one of the plurality of data producer identifiers that is associated with the workflow.

4. The method of claim 1 wherein the generating the customized workflow diagnostic is also performed based on a set of rules, said set of rules that govern workflows associated with the event profile.

5. The method of claim 4 wherein the set of rules comprise:
a time limit for responding to the event profile; and
a definition of how to present information in the customized workflow diagnostic.

6. The method of claim 4 wherein the set of rules are defined separately for each data consumer module.

7. The method of claim 1 wherein:
the event profile is one of a plurality of event profiles, and the method further comprises performing the tagging, logging, storing, and linking steps for each of the plurality of event profiles; and
the customized workflow diagnostic is based on each of the plurality of event profiles.

8. The method of claim 7 wherein the Apache Kafka framework comprises a plurality of segmented Kafka topics for logging event profiles separately, and the method further comprises:
segmenting the plurality of event profiles into predetermined categories of data; and
logging the plurality of event profiles in the plurality of segmented Kafka topics based on the predetermined categories of data.

9. A multi-dimensional database system for event data processing and provisioning, said system comprising:
an Apache Kafka framework;
an auxiliary database;
a processor; and
computer code stored in non-transitory memory that, when run on a processor, are configured to:
receive an event profile from one of a plurality of data producer modules, wherein said event profile represents a customer request;
tag the event profile with:
a timestamp;
a unique event identification code;
an event type descriptor;
a data producer identifier wherein the data producer identifier identifies a data producer from which the event profile was received; and
a workflow identifier;
log, in the Apache Kafka framework, the timestamp and the event identification code, as part of a sequential stream of events, wherein, to log in the Apache Kafka framework, the system is configured to:
create a primary entry comprising the event identification code, the timestamp, and a log identification code; and
create a secondary entry comprising the log identification code and log attribute information;
store, in the auxiliary database, the event identification code, the event type descriptor, the data producer identifier, and the workflow identifier;
link the information stored in the auxiliary database to the information logged in the Apache Kafka framework via the event identification code;
receive a request from one of a plurality of data consumer modules for a customized workflow diagnostic, said request comprising a specification for the customized workflow diagnostic;
generate the customized workflow diagnostic based on the specification and on data from the Apache Kafka framework and the auxiliary database as linked via the event identification code; and
transmit the customized workflow diagnostic to the data consumer module wherein a set of rules governing workflow associated with the event profile is defined for the data consumer module.

10. The system of claim 9 wherein:
to store in the auxiliary database, the system is further configured to create a database entry comprising the event identification code, the event type descriptor, the data producer identifier, and the workflow identifier, wherein:
the data producer identifier is one of a plurality of data producer identifiers, and each of the plurality of data producer identifiers is associated with data producer information; and
the workflow identifier is one of a plurality of workflow identifiers, and each of the plurality of workflow identifiers is associated with workflow information.

11. The system of claim 10 wherein:
the data producer information comprises a data producer name; and
the workflow information comprises:
a workflow name;

a parent workflow identifier, said parent workflow identifier being a one of the plurality of workflow identifiers that precedes the instant workflow identifier in a workflow sequence; and one of the plurality of data producer identifiers that is associated with the workflow.

12. The system of claim 9 further configured to generate the customized workflow diagnostic based also on a set of rules, said set of rules that govern workflows associated with the event profile.

13. The system of claim 12 wherein the set of rules comprise:

a time limit for responding to the event profile; and a definition of how to present information in the customized workflow diagnostic.

14. The system of claim 9 wherein the set of rules are defined separately for each data consumer module.

15. The system of claim 9 wherein:

the event profile is one of a plurality of event profiles, and the system is further configured to perform the tag, log, store, and link for each of the plurality of event profiles; and the customized workflow diagnostic is based on each of the plurality of event profiles.

16. The system of claim 15 wherein the Apache Kafka framework comprises a plurality of segmented Kafka topics for logging event profiles separately, and the system is further configured to:

segment the plurality of event profiles into predetermined categories of data; and log the plurality of event profiles in the plurality of segmented Kafka topics based on the predetermined categories of data.

17. A multi-dimensional database system for event data processing and provisioning, said system comprising:

an Apache Kafka framework;

an auxiliary database;

a processor; and computer code stored in non-transitory memory that, when run on a processor, are configured to:

receive a plurality of event profiles from a plurality of data producer modules, wherein one of said event profiles represents a customer request;

in real-time, tag each event profile with:

a timestamp;

a unique event identification code;

an event type descriptor;

a data producer identifier wherein the data producer identifier identifies a data producer from which the event profile was received; and a workflow identifier;

for each event profile, in real-time:

log, in the Apache Kafka framework, the timestamp and the event identification code, as part of a sequential stream of events, wherein, to log in the Apache Kafka framework, the system is configured to:

create a primary entry comprising the event identification code, the timestamp, and a log identification code; and create a secondary entry comprising the log identification code and log attribute information;

store, in the auxiliary database, the event identification code, the event type descriptor, the data producer identifier, and the workflow identifier; and link the information stored in the auxiliary database to the information logged in the Apache Kafka framework via the event identification code;

receive a request from one of a plurality of data consumer modules for a customized workflow diagnostic, said request comprising a specification for the customized workflow diagnostic, and said customized workflow diagnostic including a representation of data from the plurality of event profiles;

generate the customized workflow diagnostic based on the specification and on data from the Apache Kafka framework and the auxiliary database as linked via the event identification codes of the plurality of event profiles; and transmit the customized workflow diagnostic to the data consumer module wherein a set of rules governing workflow associated with the event profile is defined for the data consumer module.

18. The system of claim 17 wherein, to store each event profile in the auxiliary database, the system is further configured to create a database entry comprising the event identification code, the event type descriptor, the data producer identifier, and the workflow identifier, wherein:

the data producer identifier is one of a plurality of data producer identifiers, and each of the plurality of data producer identifiers is associated with data producer information; and the workflow identifier is one of a plurality of workflow identifiers, and each of the plurality of workflow identifiers is associated with workflow information.

19. The system of claim 17 further configured to generate the customized workflow diagnostic based also on a set of rules, said set of rules that govern workflows associated with the plurality of event profiles.

\* \* \* \* \*